(12) United States Patent
Baeuerle et al.

(10) Patent No.: US 7,927,550 B2
(45) Date of Patent: Apr. 19, 2011

(54) MICROFLUIDIC CONNECTION

(75) Inventors: Martin Baeuerle, Buehlertal (DE); Jan Eikhoff, Straubenhardt (DE)

(73) Assignee: Agilent Technologies, Inc., Santa Clara, CA (US)

( * ) Notice: Subject to any disclaimer, the term of this patent is extended or adjusted under 35 U.S.C. 154(b) by 465 days.

(21) Appl. No.: 10/584,814

(22) PCT Filed: Apr. 27, 2004

(86) PCT No.: PCT/EP2004/050620
§ 371 (c)(1),
(2), (4) Date: Dec. 3, 2008

(87) PCT Pub. No.: WO2005/102509
PCT Pub. Date: Nov. 3, 2005

(65) Prior Publication Data
US 2009/0214390 A1 Aug. 27, 2009

(51) Int. Cl.
*G05D 16/06* (2006.01)
(52) U.S. Cl. .......... 422/113; 137/67; 137/832; 137/833; 251/336
(58) Field of Classification Search ................. 422/113; 137/67, 832, 833; 251/336
See application file for complete search history.

(56) References Cited

U.S. PATENT DOCUMENTS

| | | | | |
|---|---|---|---|---|
| 4,182,354 A | * | 1/1980 | Bergstedt | 137/10 |
| 6,290,791 B1 | | 9/2001 | Shaw et al. | 156/64 |
| 6,395,232 B1 | | 5/2002 | McBride | 422/100 |
| 7,622,081 B2 | * | 11/2009 | Chou et al. | 422/100 |
| 2004/0018116 A1 | * | 1/2004 | Desmond et al. | 422/58 |

FOREIGN PATENT DOCUMENTS

| | | |
|---|---|---|
| EP | 1 327 474 | 7/2003 |
| WO | WO 94/21372 | 9/2004 |

OTHER PUBLICATIONS

F. Eckhardt et al., "MUSE, Lap-on-Chip for Chemical analysis In-Situ".

* cited by examiner

*Primary Examiner* — In Suk Bullock
*Assistant Examiner* — Timothy G Kingan

(57) ABSTRACT

A microfluidic connection comprising a carrier element having a microfluidic channel fixed between a feeding element and a backplate. The feeding element comprises a channel adopted for feeding a fluid into the microfluidic channel of the carrier element. The backplate comprises a recess arranged opposing the feeding element and comprising an elastic thrust piece.

33 Claims, 3 Drawing Sheets

MICROFLUIDIC CONNECTION

This application is the National Stage of International Application No. PCT/EP2004/050620, filed on 27 Apr. 2004 which designated the United States of America, and which international application was published as Publication No. WO 2005/102509.

FIELD OF THE INVENTION

The present invention relates to a microfluidic connection.

DISCUSSION OF THE BACKGROUND ART chemical analysis microfluidic devices are becoming increasingly important. The so-called lap-on-chip technology allows to perform chemical reactions and chemical analysis on microscopic scale using very small compound volumes. Microfluidic devices minimize the time and costs associated with biological and chemical analysis and will improve reproducibility. Furthermore, multiple experiments can be performed on a single small chip. Due to the small size only a few tenths of nanoliters up to a few microliters of different compounds are used, resulting in a faster and more accurate reaction. The paper by F. Eckhardt et al., "MUSE, Lap-on-Chip for Chemical Analysis In-Situ" found at: "https://escies.org/public/mnt4/S4.2Eckhard.pdf" gives an overview about different analysis methods using a lap-on-chip technology.

FIG. 3 of the paper shows a typical microfluidic device used for chemical analysis including microfluidic channels connected to inlet areas for injecting the fluids.

While chemical analysis or even chemical reactions can be performed in microfluidic channels or reactors respectively, one might connect microfluidic devices together or a microfluidic device to a macrofluidic device and inject the fluids into the microfluidic channels. It is an object of this invention to provide an improved microfluidic connection.

SUMMARY OF THE INVENTION

According to an embodiment of the invention the microfluidic connection comprises a carrier element adopted to have a microfluidic channel. A carrier element is fixed between a feeding element and a backplate, the feeding element comprising a channel adopted for feeding a fluid into the microfluidic channel of the carrier element. The fixing of the carrier element having the microfluidic channel between the feeding element and the backplate allows the fluid to be pressed into the microfluidic channel using very high pressure. The use of very high pressures up to 400,000 hPa (400 bar) might be necessary, since the volume of the microfluidic channels is very small, thus resulting in a very high friction between the channel walls and the fluid.

The expression microfluidic device or microfluidic channel defines or describes respectively a device having dimension not achievable by conventional processing methods like drilling, boring, milling eroding or the like. A microfluidic channel might not be structured by mechanical means but by different processes involving light. Such processes include laser ablating or different etching methods. The dimension of such channels can vary in the range of 10 μm or less up to approximately 100 μm. Channels, holes structured by mechanical means are considered a macrofluidic devices.

The backplate represents a pressure imposing element compensating the filling pressure of the fluid and protecting the connection between the macrofluidic channel of the feeding element and the microfluidic channel of the carrier element from damage and especially from bursting. In one embodiment of the invention the channel of the feeding element comprise a microfluidic channel. In this embodiment the invention forms a tight, high pressure stable connection between two microfluidic channels. Such connection can be used to inject a fluid into a microfluidic reactor. In an alternate embodiment of the invention, the channel of the feeding element is structured to form a macrofluidic channel, thereby connecting the microfluidic channel.

In a further embodiment of the invention the carrier element comprises at least a first and a second layer, wherein at least the first or the second layer is structured to form a microfluidic channel. This structure can be etched or ablated by a laser-induced process.

In a further embodiment the carrier element, and preferably the first layer, comprises an opening on a first side adopted for feeding a fluid from the feeding element into the microfluidic channel. The opening is arranged below the feeding element. The dimension of the channel head of the feeding element has approximately the same value as the dimension of the opening in the first layer. In yet another embodiment the diameters are different. Such a structure will result in a relatively big opening compared to the dimension of the microfluidic channel.

In a further embodiment of the invention the backplate is arranged on a second side of the carrier element at least partly upholding the feeding element. The fluid feeding pressure acting upon the layer of the carrier elements are compensated by the back pressure of the backplate.

In a further embodiment of the invention the backplate is connected to the feeding element by a screw connection. This will allow a backplate and the feeding element to be pressed tightly together thereby fixing the opening of the microfluidic channel. Alternately the microfluidic channel comprises a clamping element for pressing the feeding element and the backplate together.

In a further embodiment of the invention the backplate comprises a recess filled by an elastic thrust piece. The elastic thrust piece results in a dynamic back pressure depending on the feeding pressure of the fluid. It further represents a safety device for protecting the connection against overpressure of the fluid. In an embodiment of this invention the feeding element comprises a second microfluidic channel arranged next to the first microfluidic channel and connected to a small microfluidic volume in the carrier element. The small microfluidic volume is arranged over the elastic thrust piece and disconnected from the microfluidic channel by a valve. Exceeding the feeding pressure of fluid will result in an overpressure of the elastic thrust piece thereby opening the valve between the microfluidic channel and the microfluidic volume, thereby reducing the overpressure. In an embodiment of this invention a small wall is formed between the microfluidic channel and the microfluidic volume adopted to form the valve.

In a further embodiment the elastic thrust piece comprises at least on of the following materials: Teflon, polyurethane, PEEK, or elastomers. Alternately the elastic thrust piece comprises a spring arranged in the recess.

The backplate as well as the feeding element might comprise steel or tantalum or titan or PEEK respectively. The carrier element can comprise a first and a second layer formed by polyimides or PEEK foils. In an embodiment the thickness of the carrier element is approximately 300 μm but can be less or more than this. The microfluidic channel comprises a thickness of approximately 50 μm. Alternately the thickness of the carrier element is in the range of about 100 μm to 1000 μm, while the dimension of the microfluidic channel is in the range of 10 μm to 100 μm. The thickness of the carrier element can even be greater, if more different layer are used. In this embodiment of the invention the microfluidic connection is adopted for withstanding fluid feeding pressures up to 400 bar.

BRIEF DESCRIPTION OF THE DRAWINGS

Other objects and many of the attendant advantages of the embodiment of the present invention will be readily appreciated and better understood by reference to the following description of preferred embodiments. The embodiments are presented in connection with the accompanying drawings. The drawings referenced herein are used for illustration purposes only. It will be apparent to those skilled in the art that those drawings do not limit the scope of the invention. Features, that are substantially or functionally equal or similar will be referred to with the same reference signs.

DETAILED DESCRIPTION OF THE PREFERRED EMBODIMENT

Figure 1:
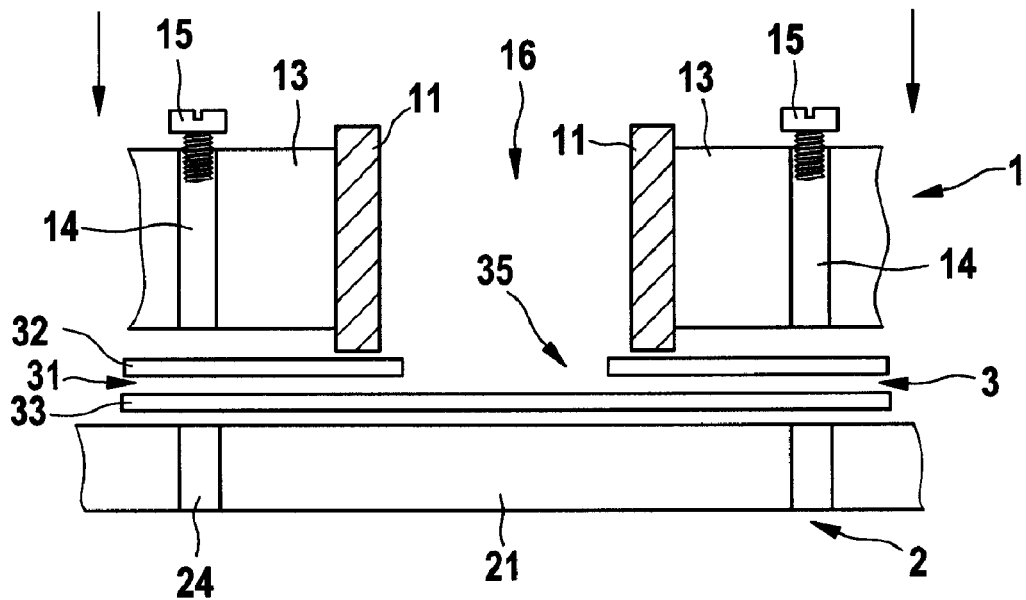
FIG. 1 shows a cross-sectional side view of a first embodiment of the present invention.

FIG. 1 shows a first embodiment of the present invention of a carrier element comprising a microfluidic channel fixed between a feeding element and a backplate. The carrier element 3 comprises a first layer 32 having an opening 35 and a second layer 33. The first layer 35 is arranged onto the second layer 33. The second layer 33 is structured to form a microfluidic channel. The microfluidic channel, for example, can be structured by etching into the surface of the second layer 33. Alternatively the structure of the microfluidic channel can also be ablated from the surface of the layer 33 by a laser-induced process. The etching and the ablation method as well as similar structuring processes will result in a small recess in layer 33, having a depth of roughly 5 μm-50 μm. On this second structured layer the first layer 32 comprising the opening 35 is arranged. The first layer 32 is glued onto the second layer. The opening 35 is placed directly above a structured microfluidic channel in the layer 33. A fluid can be injected into the microfluidic channel via the opening 35.

Structuring a microfluidic channel in the carrier element 3 according to this embodiment of the invention is also described in detail in application EP 1 350 759, which is incorporated herein by reference. On top of layer 32 and the hole 35 the feeding element 1 is arranged. The feeding element 1 comprises a tube 16, whose walls 11 are shown in FIG. 1. The tube represents a macrofluidic channel with a channel head placed directly over the opening 35 of the second layer 32 of the carrier element 3.

The tube 16 with its walls 11 is made of steel or tantalum or fused silica or similar material, capable of withstanding high pressures. The diameter of the tube 16 is approximately 10 times bigger than the opening 35 of the carrier element 3. A fastening device 13 is welded or bonded or similar, but tightly connected onto the tube's walls 11. The fastening device 13 comprises at least two bore holes 14 through the metal of the fastening device 13 on each side of the tube 16. The bore holes 14 are formed as housings for screws 15, which are used to connect the backplate 2 with the feeding element 1.

The backplate element 2 also comprises two bores with internal threads and centering locations 24. The backplate 2 is made of steel or other suitable materials. Screws 15 are arranged in the bore holes of the feeding element 1 and screwed down to the bores 24. Thereby the feeding element 1 is tightly connected to the backplate 2, fixing the carrier element 3 in between. The backplate element is functioning as a back pressure safety device for compensating the feeding pressure of the fluid during the injection.

Figure 2:
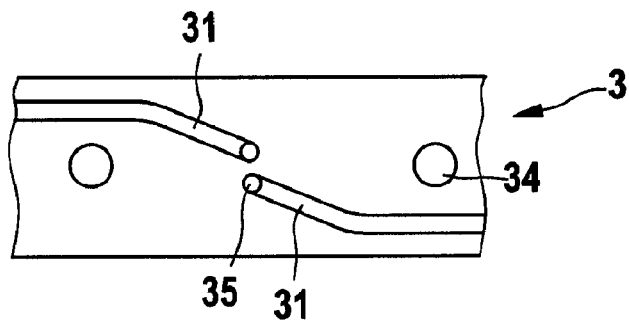
FIG. 2 shows the top view of the carrier element according to the first embodiment.

A top view of the carrier element 3 can be seen in FIG. 2. The carrier element 3 comprises two openings 35, each one connected to one of the microfluidic channels 31. Furthermore, the carrier element 3 comprises two bore holes 34 for the screws 15. In this embodiment of invention the screws 15 are screwed down through the openings 34 of the carrier element 3 into the threaded bores 24 of the backplate 2. The tight and fixed connection will allow to press a fluid through the tube of the feeding element 1 and into the microfluidic channel 31 of the carrier element 3. The feeding pressure is approximately 200 to 400 bar.

The tight connection between the backplate 2 and feeding element 1 is necessary to prevent the liquid from penetrating the connection between the tube walls 11 and the first layer 32 of the carrier element 3. Thus the screws 15 ensure a tight connection of a macrofluidic channel and a microfluidic channel.

Figure 3:
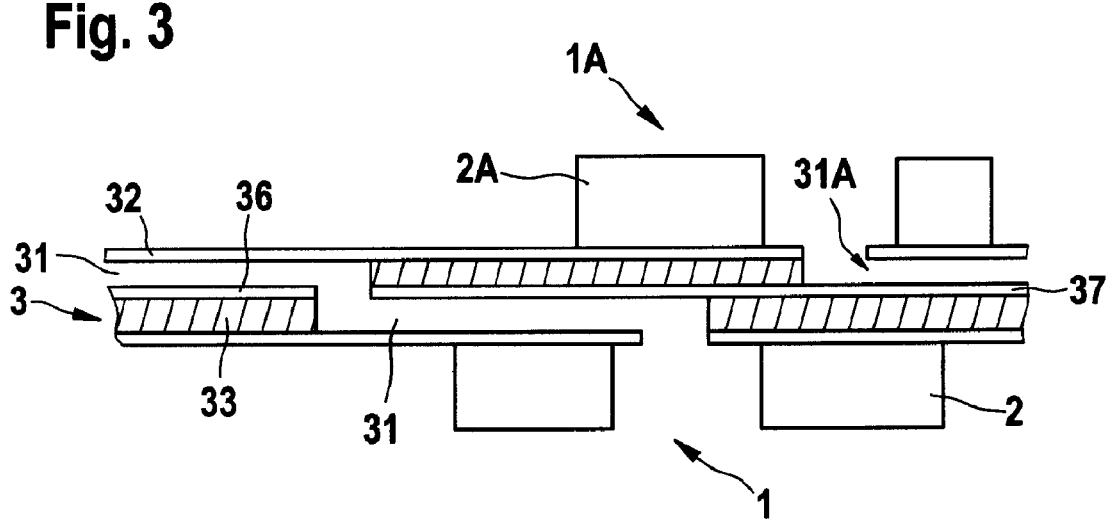
FIG. 3 shows a cross-sectional side view of a second embodiment of the present invention.

The carrier element 3 can also be structured in more complex way having different layers and also comprising microfluidic channels, wherein chemical reactions are performed or initialized respectively. However, these channels have to have a microfluidic connection between macrofluidic volumes or channels respectively and their microfluidic volume. A microfluidic connection according to a second embodiment is shown in FIG. 3.

The carrier element comprises two different microfluidic channels 31 and 31A. These two different microfluidic channels 31 and 31A are separated horizontally as seen in FIG. 3 as well as vertically by a third layer 37. The different layers are glued or polymerized together respectively in those parts, in which no microfluidic channel is structured. Depending on the materials for the layer used the glues or the polymerization process and methods are different. In this embodiment of the invention the top layer 32, the middle layer 37 as well as the bottom layer 33 all comprise polyimide. This material can be structured in an easy way by an etching method or a laser-induced ablation process to form the microfluidic channels. The material is chemically resistant and neutral for the components to be processed within the microfluidic channels.

In this example the first microfluidic channel 31 comprises an opening in the bottom layer 33 which is connected to a first feeding element 1. The first feeding element 1 connects a macrofluidic volume to the microfluidic channel 31. Opposing the opening of the first microfluidic channel 31 a backplate element 3A is arranged. This element 3A is also part of a second feeding element 1A. This second feeding element 1A connects the second microfluidic channel 31A to a macrofluidic volume. Furthermore a part of the first feeding element 1 also represents the backplate element 3 opposing the second feeding element 1A. Both feeding elements are connected tightly together. Each of the backplate elements 3 and 3A respectively of the feeding elements 1 and 1A compensate the fluid feeding pressure when injecting a fluid through the macrofluidic channels of the feeding elements 1 and 1A into the respective microfluidic channels 31 and 31A. The feeding elements comprise steel or tantalum or similar materials, capable of withstanding high pressures.

Figure 4:
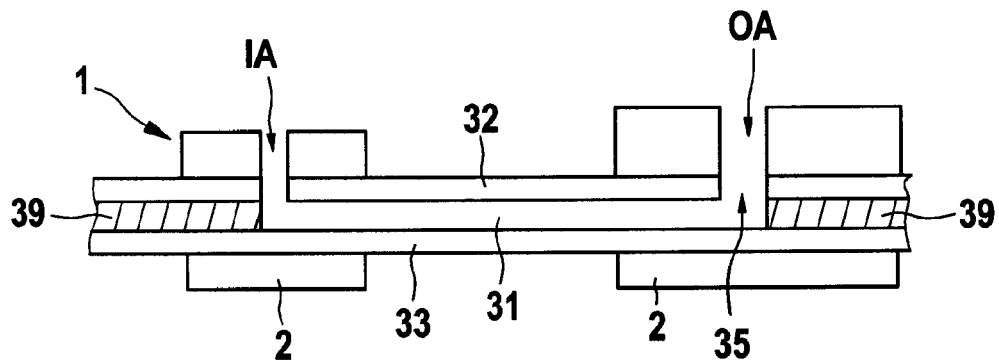
FIG. 4 shows a cross-sectional side view of a third embodiment of the present invention.

FIG. 4 shows another embodiment of the invention comprising a connection between two microfluidic channels. A microfluidic inlet area IA for feeding a fluid into a microfluidic channel 31 is provided. The channel 31 connects the microfluidic inlet area to a macrofluidic outlet area OA. The microfluidic inlet area IA is formed in the same way as the macrofluidic channel of a feeding element. However the dimension of the tube of inlet area IA is significantly smaller than the dimension of a macrofluidic supply area and in the range of the microfluidic channel 31. The carrier element 3 comprising the microfluidic channel 31 is formed by a layer 32 arranged on a structured layer 33. In the areas 39 the two layers 32 and 33 are bonded together. The structured parts are not bonded, thereby forming the microfluidic channel 31. Opposing the feeding elements 1 of the inlet area IA and the outlet area OA backplate elements 2 are arranged, tightly connecting to the respective feeding element and fixing the carrier element 3 in between.

Figure 5:
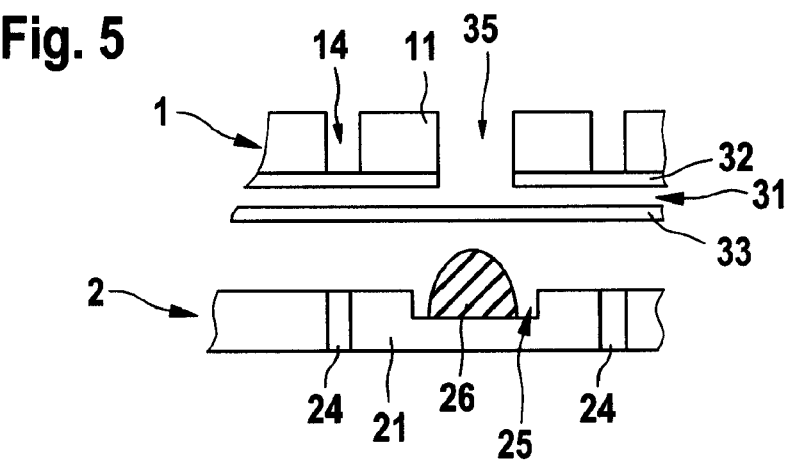
FIG. 5 shows an explosion side view of a fourth embodiment of the present invention.

FIG. 5 shows a different embodiment of the present invention. The backplate element 2 comprises a recess 25 and two bore holes 24 arranged next to the recess 25. The recess 25 comprises a specific volume and holds an elastic thrust piece 26. The elastic thrust piece 26 is flexible and comprises Teflon or any other material with a resiliency property. The explosive view of the embodiment of the invention according to FIG. 5 also shows the carrier element 3, wherein the opening 35 for the microfluidic channel 31 is to be arranged directly above the elastic thrust piece 26. The carrier element 3 is connected to the feeding element 1 comprising a tube 11 connected to the hole 35 of the carrier element 3 and bore holes 14 arranged next to the tube 11.

Figure 6:
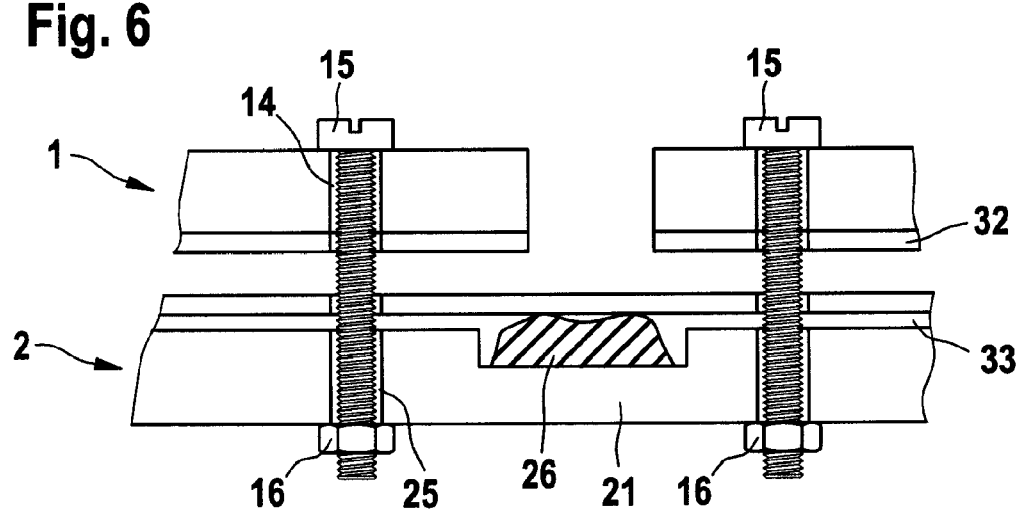
FIG. 6 shows the cross-sectional side view of the fourth embodiment of the present invention.
Figure 7:
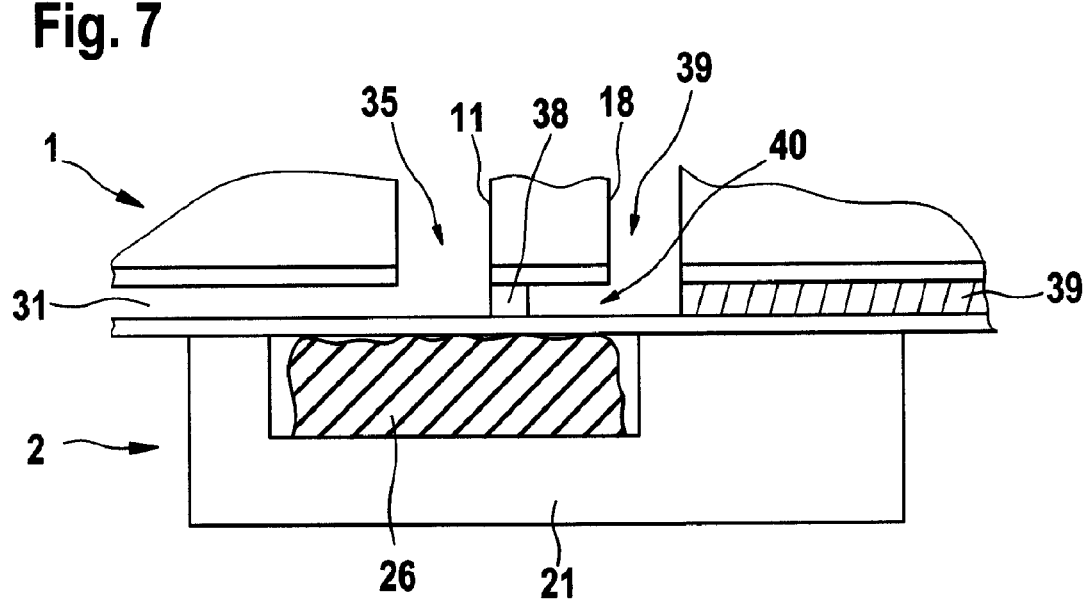
FIG. 7 shows a cross-sectional side view of a fifth embodiment of the present invention.

The feeding element 1 together with the carrier element 3 is arranged on top of the backplate element 2. The resulting structure is shown in FIG. 6. As one can see, the bore holes 14 of the feeding element 1 and the bore holes 24 of the backplate element 2 are filled by screws 15. The backplate element 2 and the feeding element 1 are fixed together by the screws 15 and screw-nuts 16. Providing the elastic thrust piece 26 in the recess 25 of the backplate element 2 allows a more flexible way to compensate for the feeding pressure of the fluid, when feeding the fluid into the microfluidic channel 31. The elastic thrust piece can also be used as protection against overpressure when feeding the fluid into the microfluidic channel. Such an embodiment can be seen in FIG. 7.

The feeding element 1 comprises a second macrofluidic channel having a tube 18, arranged next to the first tube 11. The tube 11 is connected to the hole 35, providing access to the microfluidic channel 31 of the carrier element 3. The second tube 18 is connected to a second opening 39 of the layer 32 of the carrier element 3. The carrier element 3 is structured to form a small volume 40 arranged directly next to the microfluidic channel 31 and the opening 35. However, it is separated by a small wall 98, working as an overpressure valve. The wall is connected to the first layer 32.

When the feeding pressure into the microfluidic channel 31 exceeds a specific value, the elastic thrust piece 26 is squeezed tightly together, thereby opening a small passage between the bottom of the wall 98 and the bottom layer 33. Fluids can flow to the small volume 40 and to the macrofluidic channel 18. Thereby the feeding pressure of the fluid into the microfluidic channel 31 is reduced and damage prevented.

Figure 8:
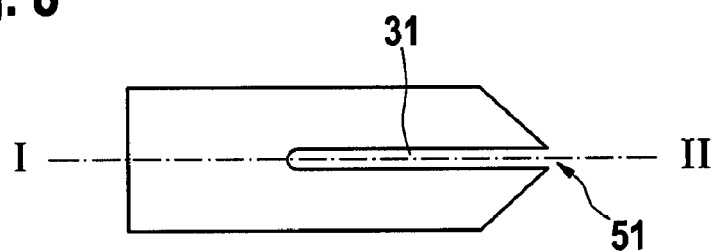
FIG. 8 shows a top view of a carrier element having a microfluidic spraying nozzle.
Figure 9:
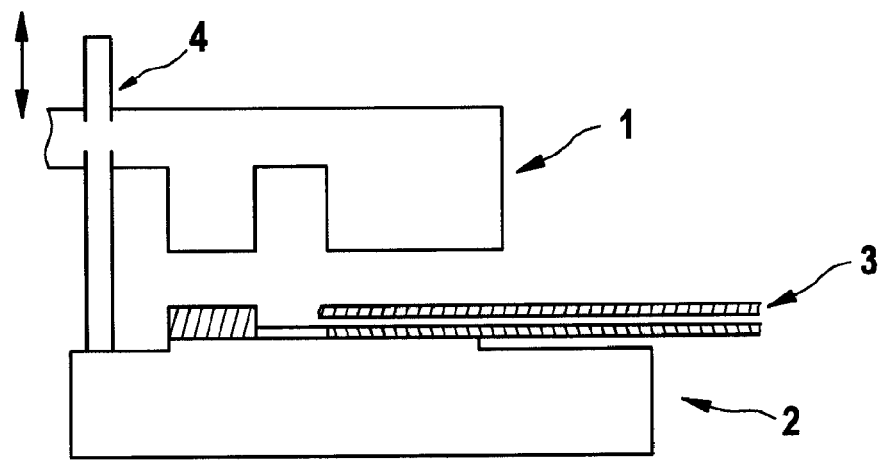
FIG. 9 shows a cross-sectional side view of a sixth embodiment of the present invention.

FIG. 9 shows another embodiment of the invention wherein the feeding element 1 is connected to the backplate element 3 by a clamp 4. A top view of the carrier element 3 comprising the microfluidic channel 31 can be seen in FIG. 8. The carrier element 3 comprises a spraying nozzle 51 connected to the microfluidic channel 31. The carrier element 3 can be used to spray a fluid into a mass spectrometer. The feeding element 1 comprising the macrofluidic channel is pressed onto the carrier element 3 by the clamp 4. The pressure exceeded by the clamp 4 must be sufficient compared to the feeding pressure when feeding a fluid from the macrofluidic channel of the feeding element 1 into the microfluidic channel 31 of the carrier element 3.

What is claimed is:

1. Microfluidic connection, comprising
a carrier element comprising a microfluidic channel fixed between a feeding element and a backplate, the feeding element comprising a channel adapted for feeding a fluid into the microfluidic channel;
wherein the backplate comprises a recess, the recess arranged opposing the feeding element, and
the recess comprises an elastic thrust piece, wherein the carrier element further comprises a planer surface in contact with the elastic thrust piece in the assembled connection.

2. The microfluidic connection of claim 1, wherein the channel of the feeding element is structured as a macrofluidic channel.

3. The microfluidic connection of claim 1, wherein the channel of the feeding element is structured as a microfluidic channel.

4. The microfluidic connection of claim 1, wherein the microfluidic channel of the carrier element is arranged between a first layer and a second layer of the carrier element.

5. The microfluidic connection of claim 4, wherein at least one of the first and second layer of the carrier element is structured to form a microfluidic channel.

6. The microfluidic connection of claim 1, wherein the carrier element comprises an opening on a first side adopted for feeding a fluid from the feeding element into the microfluidic channel.

7. The microfluidic connection of claim 1, wherein the opening is arranged below the feeding element.

8. The microfluidic connection of claim 6, wherein the feeding element comprises a tube having a macrofluldic channel and a channel 9. The microfluidic connection of claim 6, wherein the diameter of the channel head comprises approximately the same value as the diameter of the opening of the first layer.

10. The microfluidic connection of claim 7, wherein the backplate is arranged on a second side of the carrier element at least partly opposing the feeding element.

11. The microfluidic connection of claim 1, further comprising a clamping element for pressing feeding element and backplate tightly together.

12. The microfluidic connection of claim 1, wherein the backplate comprises a screw connection to the feeding element for pressing feeding element and backplate together.

13. The microfluidic connection of claim 1, wherein the backplate comprises a bore with internal thread arranged below a bore hole of the feeding element the bores adopted for holding screws.

14. The microfluidic connection of claim 12, wherein the carrier element comprises a bore hole for the screw connection of the backplate.

15. The microfluidic connection of claim 1, wherein the recess is arranged opposing the opening in the carrier element.

16. The microfluidic connection of claim 1, wherein the elastic thrust piece comprises at least teflon or polyurethane or PEEK or a material with a resiliency property.

17. The microfluidic connection of claim 1, wherein the elastic thrust piece comprises a spring loaded thrust piece arranged in the recess.

18. The microfluidic connection of claim 1, wherein a volume of the elastic thrust piece volume comprises at least the value of a volume of the recess.

19. The microfluidic connection of claim 1, wherein the backplate comprises steel or tantalum or titan or PEEK.

20. The microfluidic connection of claim 1, wherein the feeding element comprises steel or tantalum or titan or PEEK.

21. The microfluidic connection of claim 1, wherein the carrier element comprises polyimide or PEEK.

22. The microfluidic connection of claim 1, wherein a thickness of the carrier element is in the range of 100 μm to 1000 μm.

23. The microfluldic connection of claim 1, wherein a thickness of the carrier element is approximately 300 μm.

24. The microfluidic connection of claim 1, wherein a thickness of the microfluidic channel is In the range of 10 μm to 100 μm.

25. The microfluidic connection of claim 1, wherein a thickness of the microfluidic channel is approximately 50 μm.

26. The microfluidic connection of claim 1, wherein the carrier element comprises at least three different layers structured to form at least two separated microfluidic channels.

27. The microfluidic connection of claim 6, wherein the opening of the carrier element comprises a radius of smaller than 500 μm.

28. The microfluidic connection of claim 6, wherein the opening of the carrier element comprises a diameter in the range of 50 μm to 200 μm.

29. The microfluidic connection of claim 1, wherein the microfluidic connection is adopted for withstanding fluid feeding pressures up to 400000 hPa.

30. The microfluidic connection of claim 1, wherein the feeding element comprises an outlet area arranged next to the microfluidic channel.

31. The microfluidic connection of claim 1, wherein the carrier element comprises a second channel connected to an outlet area and separated from the microfluidic channel by a valve.

32. The microfluidic connection of claim 31, wherein the second channel of the carrier element is connected by an opening to a second microfluidic channel of the feeding element.

33. The microfluidic connection of claim 31, wherein the valve is adopted for automatically opening at high pressures, thus providing protection to the subsequent fluidic components.

* * * * *

UNITED STATES PATENT AND TRADEMARK OFFICE
CERTIFICATE OF CORRECTION

| | | |
|---|---|---|
| PATENT NO. | : 7,927,550 B2 | Page 1 of 1 |
| APPLICATION NO. | : 10/584814 | |
| DATED | : April 19, 2011 | |
| INVENTOR(S) | : Baeuerle et al. | |

It is certified that error appears in the above-identified patent and that said Letters Patent is hereby corrected as shown below:

On the Title page, in Item (75), in "Inventors", in column 1, line 2, delete "Eikhoff" and insert -- Eickhoff --, therefor.

In column 6, line 51, in Claim 8, delete "channel" and insert -- channel. --, therefor.

In column 7, line 26, in Claim 23, delete "microfluldic" and insert -- microfluidic --, therefor.

In column 7, line 29, in Claim 24, delete "In" and insert -- in --, therefor.

Signed and Sealed this
Ninth Day of August, 2011

David J. Kappos
*Director of the United States Patent and Trademark Office*